(12) United States Patent
Shemeta et al.

(10) Patent No.: US 12,420,364 B2
(45) Date of Patent: Sep. 23, 2025

(54) COLD WORKING TOOL FOR OPENINGS IN METAL PIECES

(71) Applicant: Electroimpact, Inc, Mukilteo, WA (US)

(72) Inventors: Paul Joseph Shemeta, Seattle, WA (US); Conner Eugene Krezman, Everett, WA (US)

(73) Assignee: Electroimpact Inc., Mukilteo, WA (US)

( * ) Notice: Subject to any disclaimer, the term of this patent is extended or adjusted under 35 U.S.C. 154(b) by 0 days.

(21) Appl. No.: 18/068,854

(22) Filed: Dec. 20, 2022

(65) Prior Publication Data

US 2024/0424623 A1 Dec. 26, 2024

(51) Int. Cl.
*B23P 9/02* (2006.01)

(52) U.S. Cl.
CPC .................................. *B23P 9/025* (2013.01)

(58) Field of Classification Search
CPC ..... B21D 41/026; B21D 41/028; B23P 9/025; B21J 15/043; Y10T 29/49938; Y10T 29/4994
USPC ....................... 72/353.4, 370.05, 370.08, 393
See application file for complete search history.

(56) References Cited

U.S. PATENT DOCUMENTS

| | | | | |
|---|---|---|---|---|
| 180,169 | A | * 7/1876 | Tasker ................... | B23B 31/40 |
| | | | | 279/2.13 |
| 4,597,282 | A | * 7/1986 | Hogenhout ............. | B23P 9/025 |
| | | | | 72/393 |
| 4,665,732 | A | * 5/1987 | Hogenhout ............. | B23P 9/025 |
| | | | | 72/393 |
| 5,433,100 | A | * 7/1995 | Easterbrook ............ | B23P 9/025 |
| | | | | 29/523 |
| 6,684,678 | B1 | * 2/2004 | Kettner .................. | B21K 1/765 |
| | | | | 72/344 |
| 8,266,782 | B2 | * 9/2012 | Miyazaki ............... | B21D 39/20 |
| | | | | 29/523 |
| 8,857,036 | B2 | * 10/2014 | Kuebel ................. | F16L 13/147 |
| | | | | 29/523 |

* cited by examiner

*Primary Examiner* — Edward T Tolan
(74) *Attorney, Agent, or Firm* — Larsen IP, PLLC; James C. Larsen

(57) ABSTRACT

A segmented mandrel for cold working having two forward segments and two rear segments positioned between the two forward segments, when fitted together have an approximately circular outline. The two forward segments and the two rear segments are movable separately and together.

5 Claims, 16 Drawing Sheets

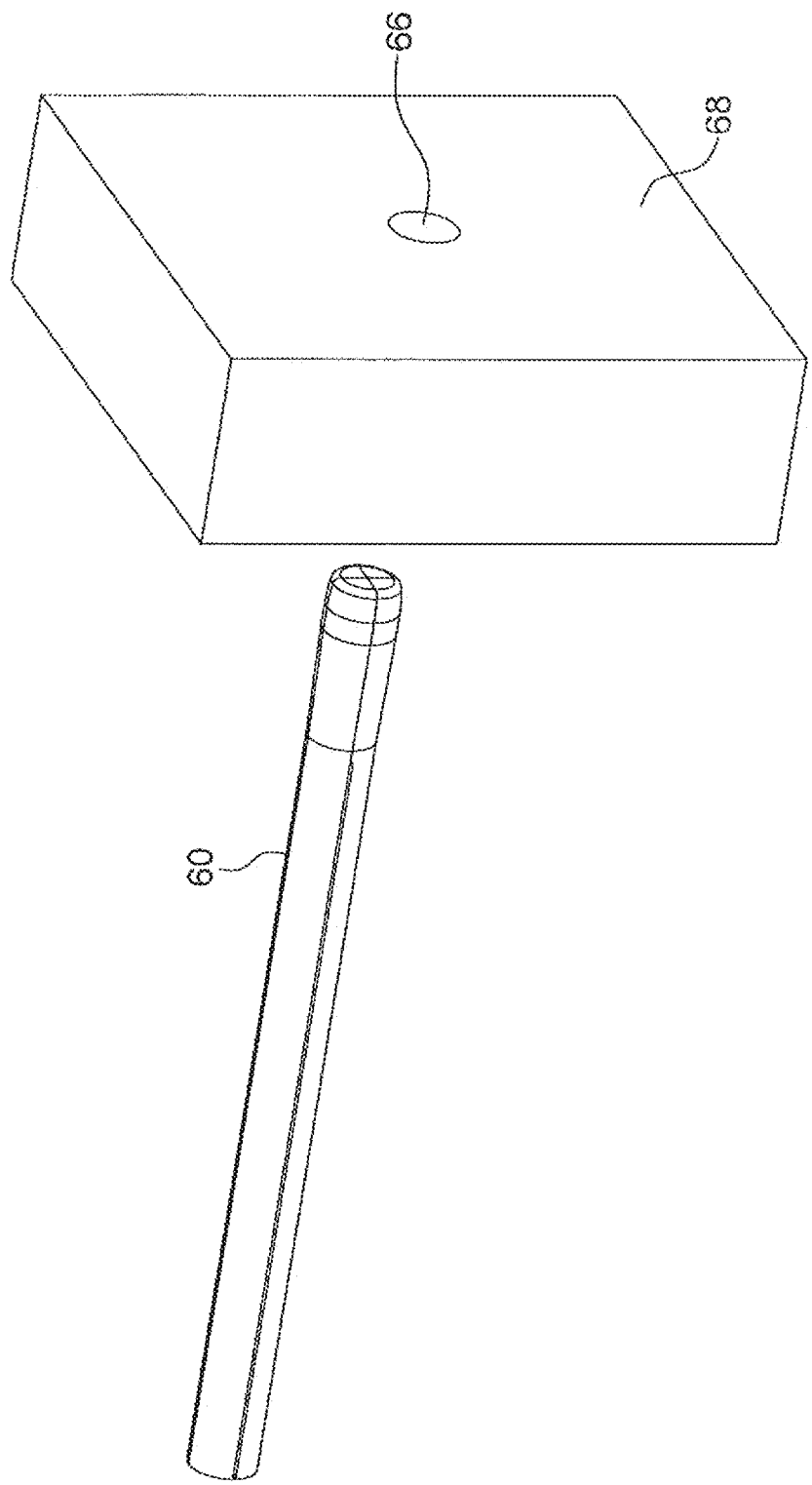

COLD WORKING TOOL FOR OPENINGS IN METAL PIECES

TECHNICAL FIELD

This invention relates generally to cold working tools and more specifically concerns a mandrel which does not include a sleeve to accomplish cold working.

BACKGROUND OF THE INVENTION

Cold working is widely used in the aircraft industry. Cold working creates compressive stress around the edges of a hole such as in an aircraft structural part, which tends to counteract the stress riser normally produced there, greatly increasing the number of load cycles for the aircraft structural part, which is desirable. Cold working is accomplished by pulling a tapered tool, such as a mandrel, through the hole, with the tool being larger than the hole. As the mandrel is pulled through the hole, it permanently increases the diameter of the hole. When the mandrel has pulled through, material apart from the hole attempts to return to its former position, which results in the material at the edge of the hole being in a high state of compression.

Generally, there are two methods which are currently used to accomplish cold working, one using a split sleeve mandrel the other a split mandrel. In split sleeve cold working, the largest diameter of a tapered mandrel is made slightly smaller than the hole to be cold worked so that it can easily pass through the hole. A thin split sleeve is slipped onto the mandrel before cold working the hole. The sleeve is placed on a smaller diameter of the tapered mandrel so that the wide part of the mandrel and the smaller part of the mandrel with the sleeve can pass through the hole. To expand the hole, the sleeve is held back and the mandrel is pulled back through the hole. The thickness of the sleeve creates the expansion needed to make the hole larger. However, since the sleeve has a split in it, allowing it to spring open and go over the larger diameter of the mandrel, a raised ridge is left inside the hole. Split sleeve also tends to over stress the material in vicinity of the split, which can result in cracks in alloys with lower ductility such as high strength aluminum alloys. Further, the sleeve can only be used once; it is also difficult to install on the mandrel and in some cases can be very difficult to remove from the hole, resulting in the cold working process being slow, expensive and virtually impossible to automate.

In split mandrel cold working, the mandrel has a hole drilled through its center, with four slots, leaving what appears to be a solid mandrel but with four fingers. The large diameter of the mandrel is larger than the hole to be cold worked; however, it is able to pass through the hole easily in one direction because the fingers can flex, which allows the mandrel to collapse and to pass through the hole in the metal member. When the mandrel is all the way through the hole, it springs back open. A pin is then moved into the hole in the center of the mandrel, preventing it from springing back when it is pulled back through the hole. The split mandrel does not require a sleeve, so it eliminates the disadvantages of that arrangement. However, the split mandrel has its own disadvantages by use of a center pin. Since the four fingers of the split mandrel do not contact each other during cold working, there is no "arch effect" between the fingers to react to external pressure, which can lead to very high stresses on the split mandrel parts, resulting in a short life for the split mandrel, and significantly limiting its usage in automatic cold work machines.

The specific structure of the present invention has a primary objective to overcome the disadvantages of the existing cold working tools.

SUMMARY OF THE INVENTION

Accordingly, the cold working tool comprises a segmented mandrel having four segments, two forward segments opposing each other and two rear segments opposing each other positioned between the two forward segments, wherein the two forward segments and the two rear segments when fitted together have an approximately circular outline, wherein each segment of the two forward segments and each segment of the two rear segments have a curved outer surface, a flat inner surface and connecting surfaces between the outer and inner surfaces, wherein the connecting surface of the two forward opposing segments are slightly relieved from a front end a distance toward the rear thereof to permit the two rear segments to press adjacent the two forward segments and permit the two rear segments and the forward two segments to pass through an opening in a metal piece and then to move outwardly so that the circumference of the segmented mandrel is larger than the opening in the metal piece, so that the opening in the metal piece is cold worked as the mandrel is pulled back through the opening.

BRIEF DESCRIPTION OF THE DRAWINGS

FIG. 16 is a simplified view showing the aligned mandrel pieces pulled back out of the hole following cold working.

BEST MODE FOR CARRYING OUT THE INVENTION

Figure 1:
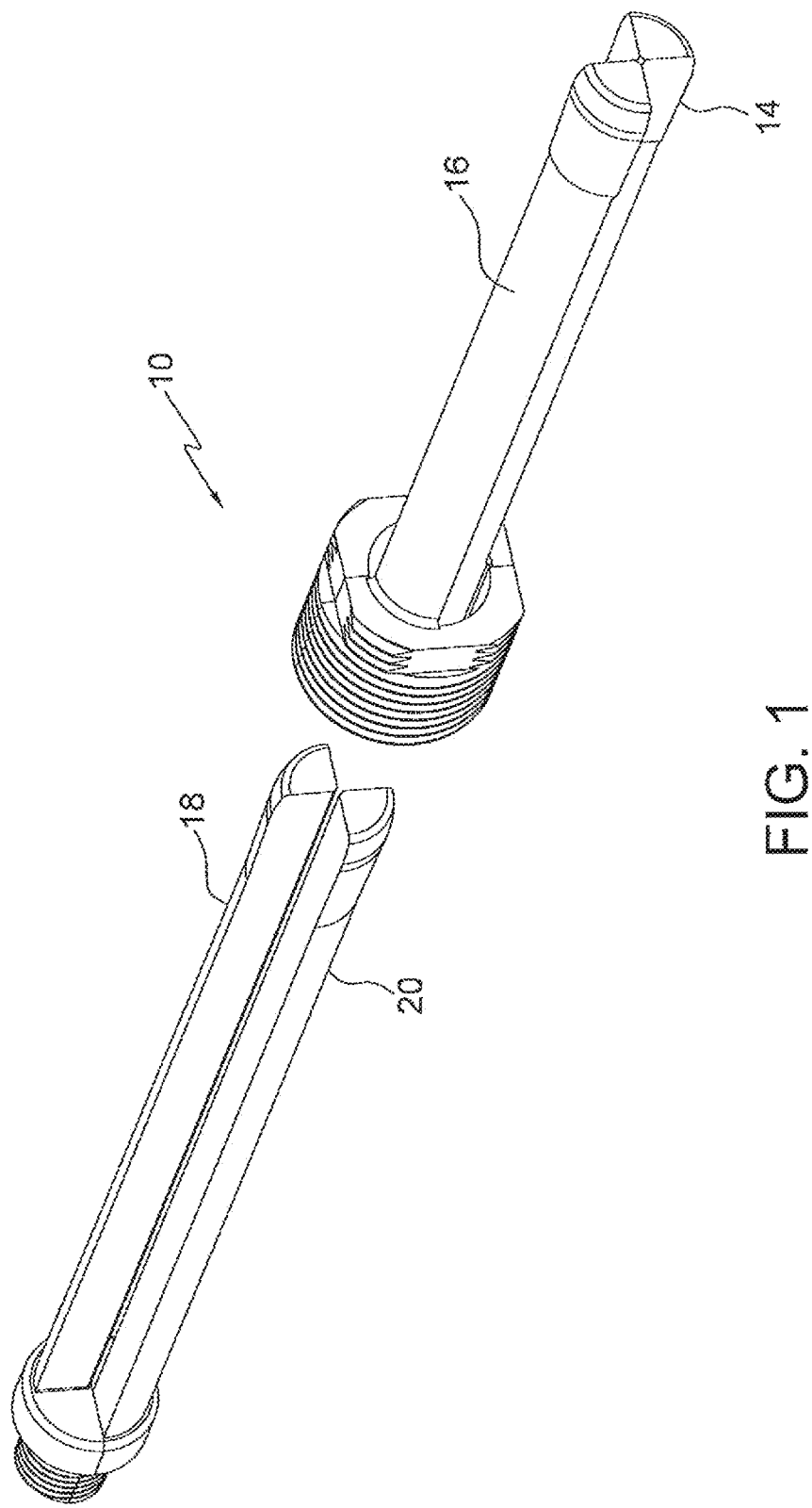
FIG. 1 is partially exploded view of the cold working mandrel of the present invention.
Figure 2:
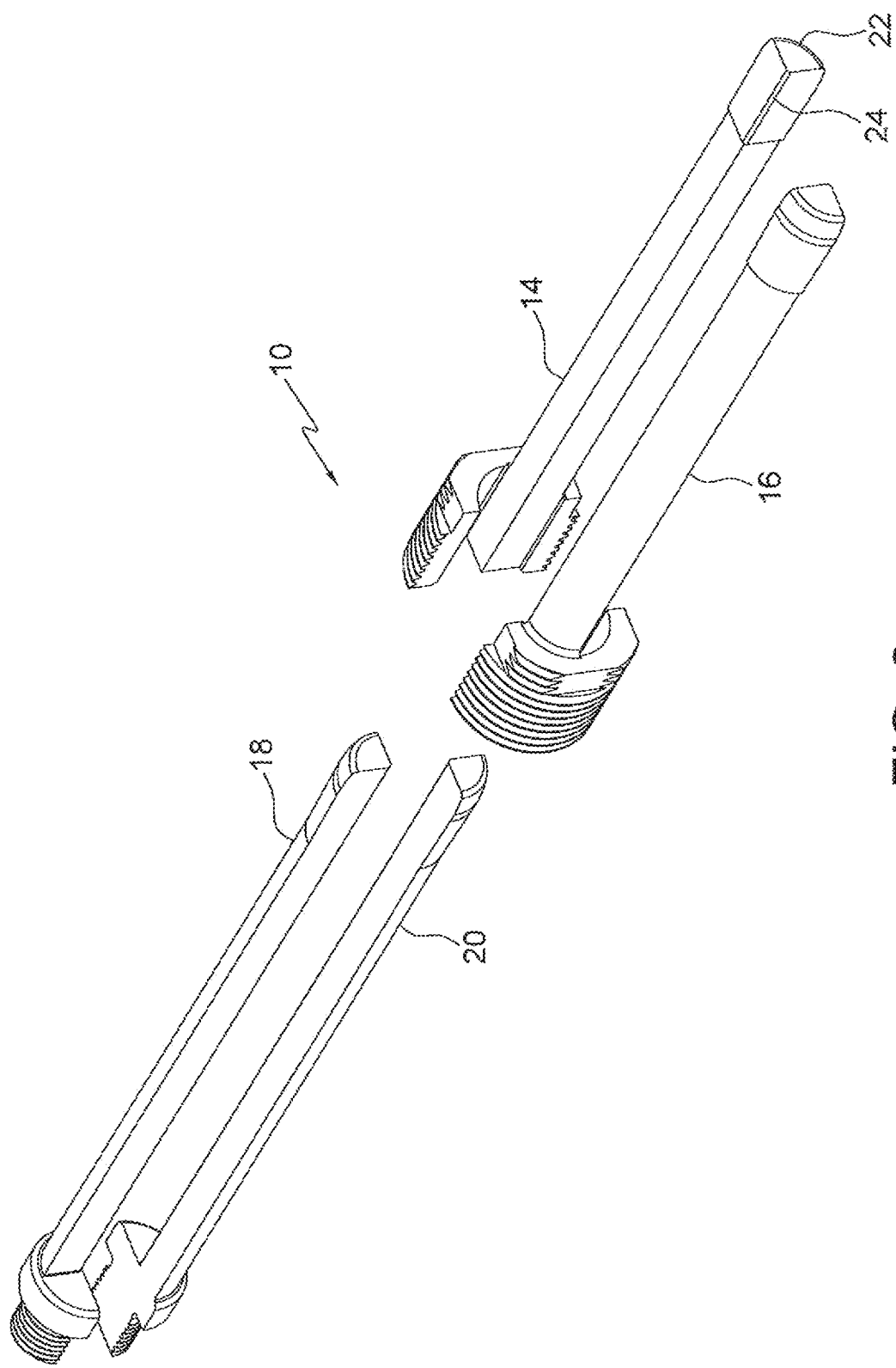
FIG. 2 is another, i.e., further exploded view of the mandrel of the present invention.
Figure 3:
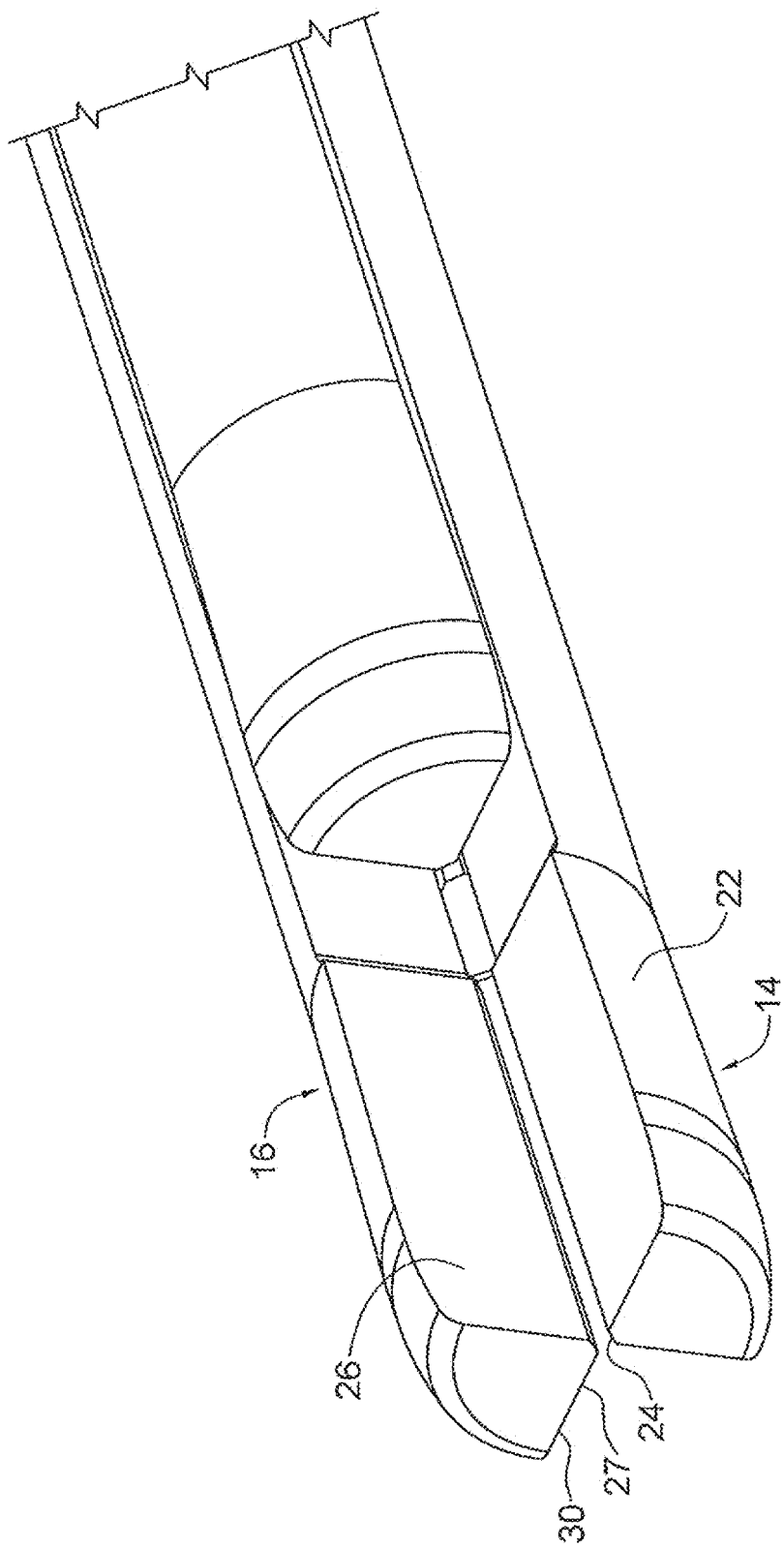
FIG. 3 is a close view of a portion of the mandrel of the present invention.

FIGS. 1 and 2 are exploded views of a preferred embodiment of the mandrel of the present invention referred to generally at 10. FIG. 3 is a close-up view of a portion of the mandrel of FIGS. 1 and 2. The mandrel is referred to herein as a segmented mandrel. The mandrel 10 includes 4 separate segments 14, 16, 18 and 20. Each segment is generally triangular in the preferred embodiment. The mandrel has a circular outer surface, with each segment in the preferred embodiment having an arc of approximately 90°. Referring to FIGS. 2 and 3, each segment includes an arcuate outer surface 22, shown for clarity on segment 14, and an inner surface 24, with the inner surface being generally flat, with a relatively small dimension of approximately 0.005"-0.015", so that the four segments can fit together conveniently, leaving a very small opening between the respective inner surfaces, as shown in FIG. 3. The outer surface and the inner surface of each segment are connected by two connecting surfaces 26 and 27, shown in FIG. 3 for segment 16.

For a selected distance rearwardly from a front end 30 toward the back of each of the forward segments 14 and 16 the connecting surfaces are slightly relieved, for example 0.003"-0.050" for a distance of approximately 0.8 inches. This is an important aspect of the segmented mandrel as it allows the rear segments to move inwardly toward the forward segments, reducing the circumference of the segmented mandrel allowing the combination of the forward and rear segments to pass through an opening in the metal piece to be cold worked.

Figure 4:
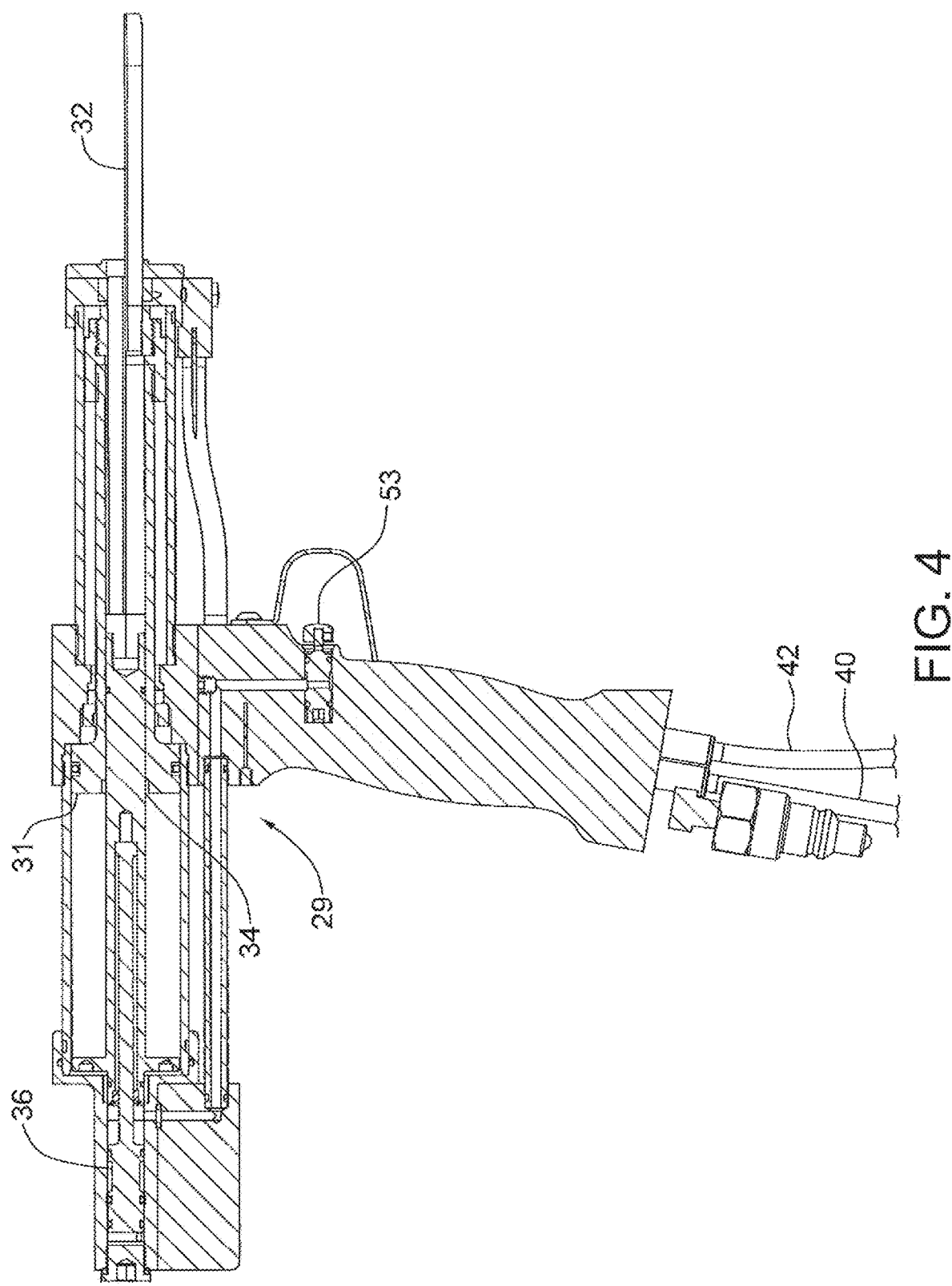
FIG. 4 is a detailed cross-sectional view of an example of a mandrel driver with a mandrel positioned therein.

In operation, the segmented mandrel of FIGS. 1 and 2 is positioned in a delivery assembly, shown in an embodiment in FIG. 4 as a driver 29, with a trigger 53 for an operator. The driver 29 generally includes an arrangement capable in operation of moving the two forward mandrel segments and the two rear segments independently, as well as moving the four segments together, with a dual piston arrangement, as shown in FIGS. 5 and 6.

Figure 5:
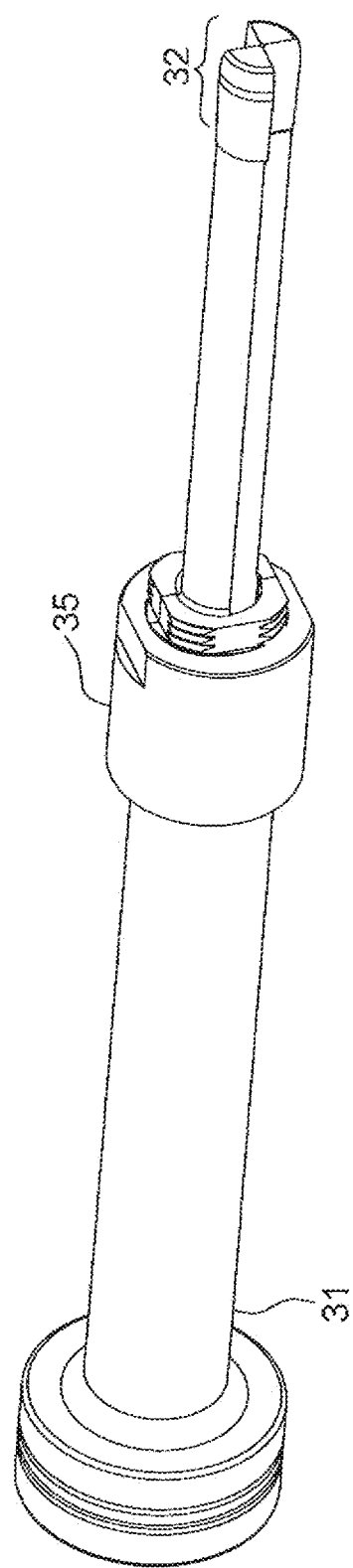
FIG. 5 is a perspective view of a piston with adapter portion of the mandrel driver with a front set of mandrel pieces.
Figure 6:
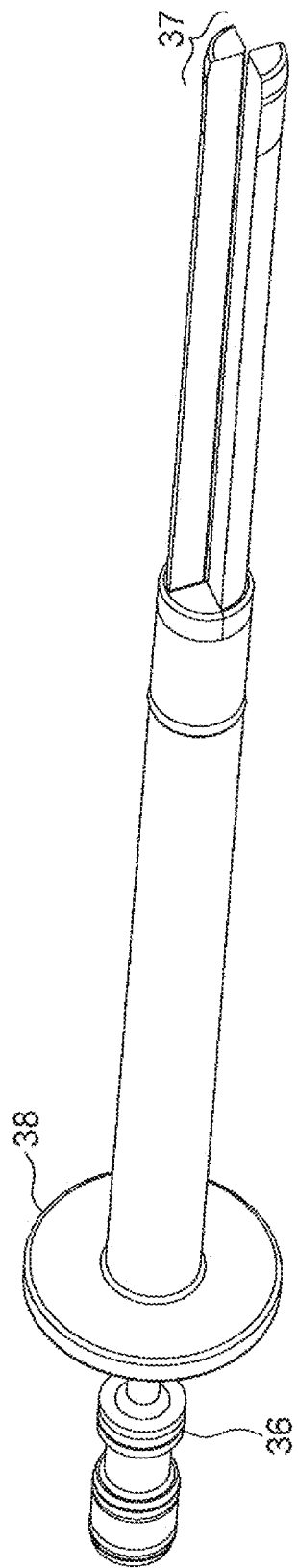
FIG. 6 is a perspective view of an inner piston portion of the mandrel driver with a rear set of mandrel segments.

The driver 29 operates an outer piston 31, controlling the forward set of mandrel segments 32, with an adaptor 35 shown in FIG. 5, while the rear set of mandrel segments 37 are controlled by an inner piston 38, as shown in FIG. 6. The piston 31, adaptor 35 and forward set of mandrel segments 32 are threaded together so that they move as a single solid piece by piston 31. The rear mandrel segments are also threaded together so that they move as a single piece by piston 38 and plunger 36. The forward mandrel segments are moveable independently of the rear mandrel segments, as well as moving together with the rear mandrel segments, to accomplish cold working. The pistons 31 and 38 are operated by air pressure and hydraulic pressure from an external source to move the forward mandrel segments through the metal piece by air pressure and then pull the mandrel back through the metal piece by hydraulic pressure.

Independently moving the forward mandrel segments, two in the preferred embodiment, and the rear mandrel segments, two in the preferred embodiment, at selected times is an important structural and functional feature of the segmented mandrel 10 of the present invention.

Figure 7:
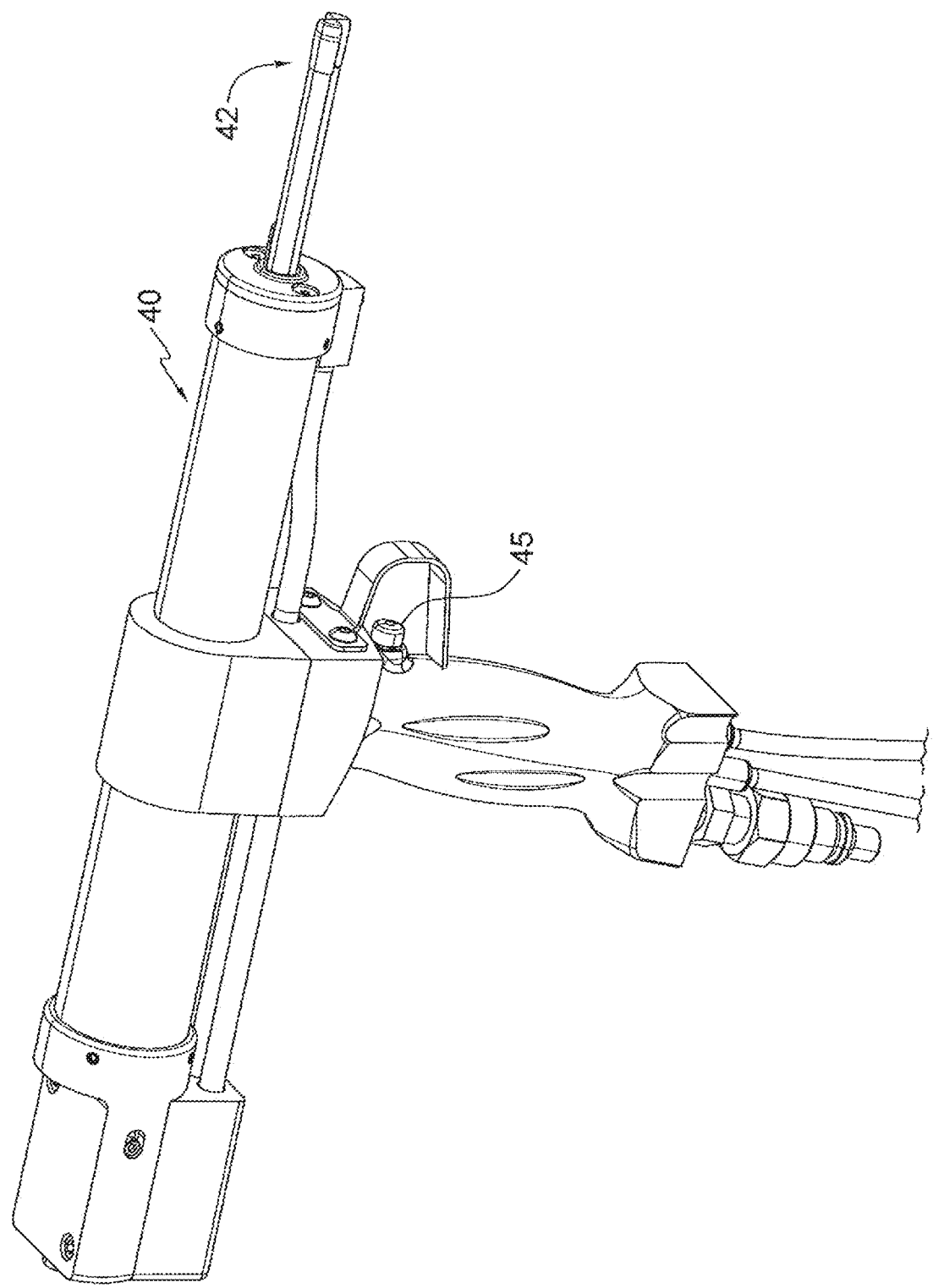
FIG. 7 is a perspective view of the mandrel driver with the forward mandrel segments shown.
Figure 8:
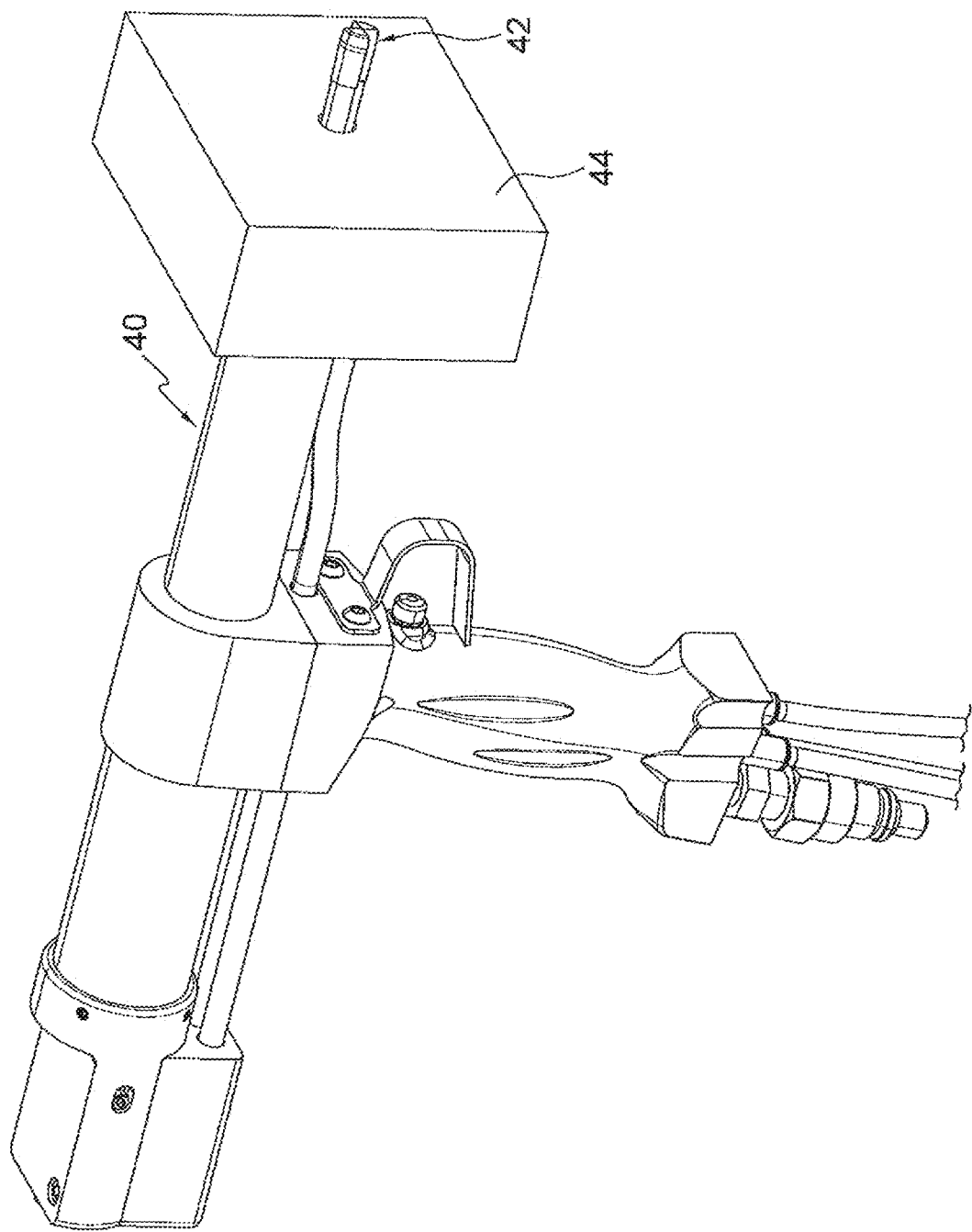
FIG. 8 is a perspective view of the mandrel driver showing the forward mandrel segments inserted through a metal piece.

FIGS. 7-10 show the sequence of operations for the segmented mandrel of the present invention in combination with a driver 40. FIG. 7 shows the combination of driver 40 and forward segments 42 about to begin the cold working process, with the forward segments 42 extended in a forward position by air pressure. FIG. 8 shows the driver 40 in a further step where the forward segments 42 of the mandrel have been inserted forwardly through a metal piece 44, with operator action alone pushing forward segments through the hole, since air pressure has already extended the forward segments.

Figure 9:
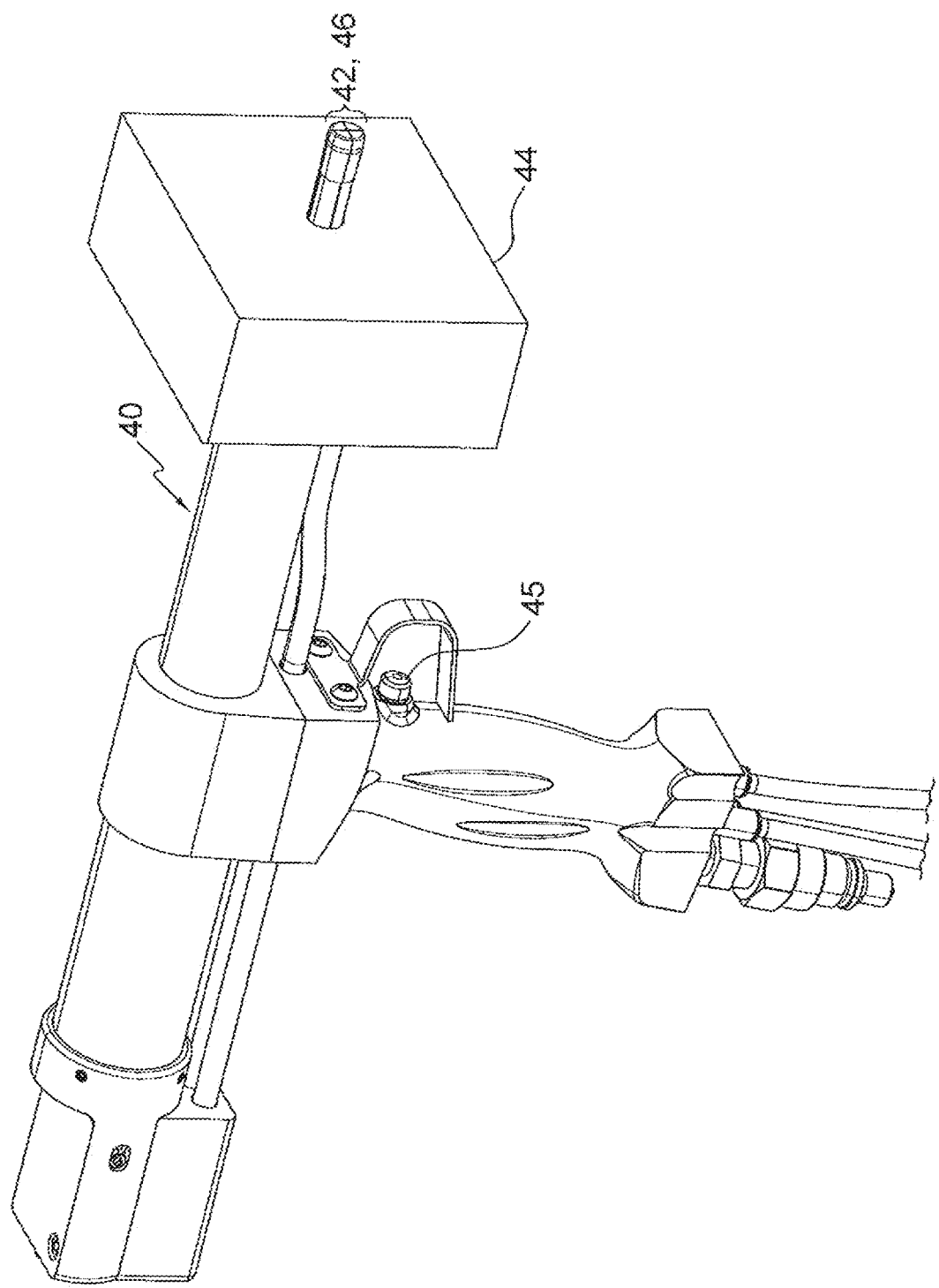
FIG. 9 is a perspective view showing the forward and rear segments of the mandrel together through the metal piece.
Figure 10:
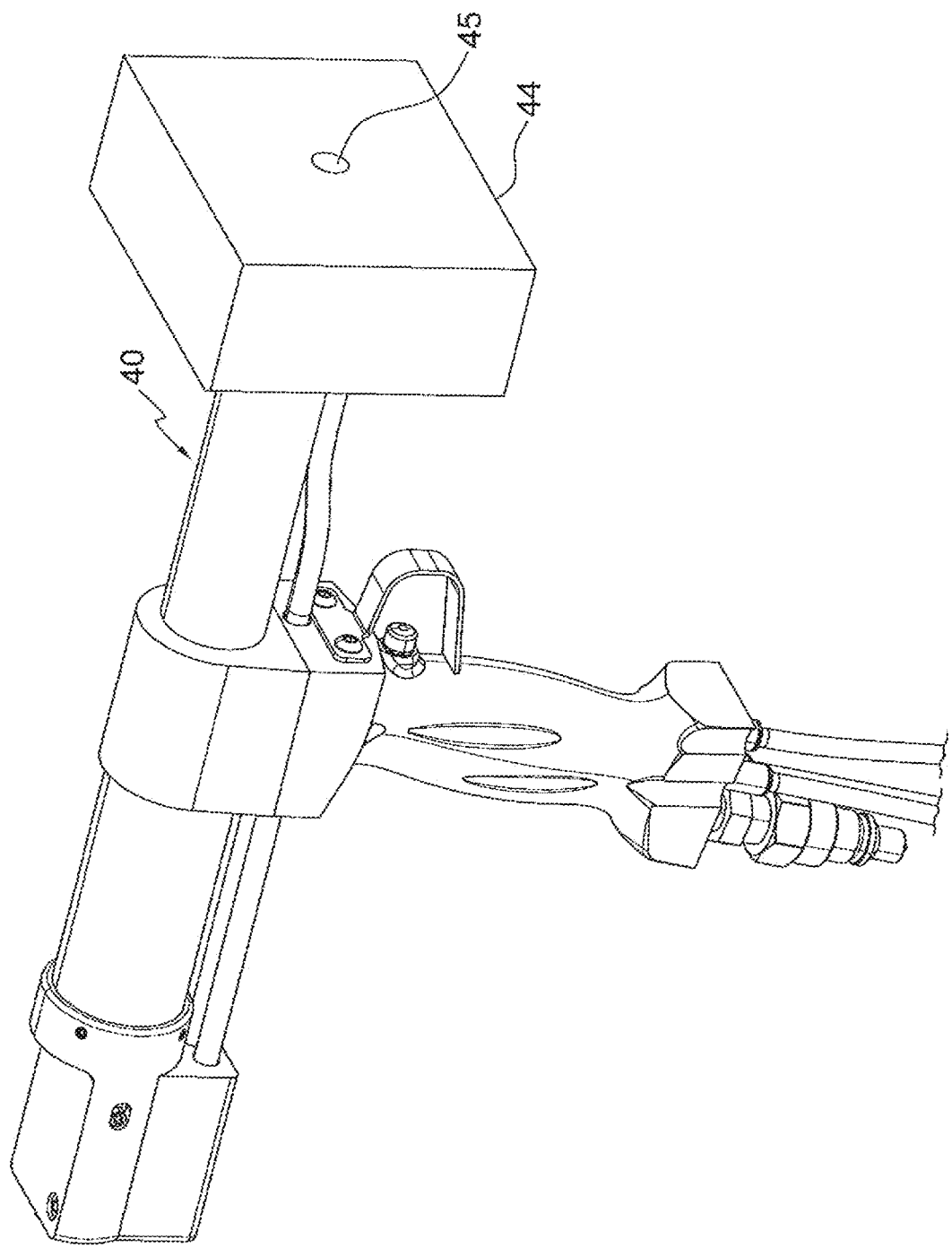
FIG. 10 is a perspective view showing the mandrel being pulled back through the opening in the metal piece.

FIG. 9 shows a further step in which the rear mandrel segments 46 have been moved through the metal piece by air pressure with the operator pulling trigger 45 and are now positioned in a forward arrangement adjacent to the forward mandrel segments 42, shown in combination. Again, as indicated above, the physical arrangement of the forward mandrel segments 42 with the connecting surfaces being slightly relieved, approximately 0.003"-0.050", permits the rear mandrel segments 46 to be moved through the metal piece 44 by air pressure. When the rear mandrel segments have been moved through the metal piece and now form a complete segmented mandrel as shown in FIG. 9, the segmented mandrel is far enough forward so that the rear mandrel segments expand outwardly, such that the complete segmented mandrel has a larger circumference than the opening in the metal piece 44. In the next step, as shown in FIG. 10, driver 40 has actuated the forward and rear mandrel segments 42, 46 together, drawing them back though opening 45 in the metal piece by hydraulic pressure, performing the cold working function. In operation, when the driver 40 senses that the rear segments 46 are all the way through the metal piece, it sends a signal to the hydraulic pump to start pumping, 10,000 PSI is one embodiment. When the mandrel is pulled completely back through opening 45 in the metal piece, the pistons controlling the rear mandrel segments and the forward mandrel segments are activated to return the rear mandrel segments and the forward mandrel segments to their original position, as shown in FIG. 7. These actions are controlled by the driver 40 with air pressure and a hydraulic pump for pulling action via trigger 45.

Figure 11:
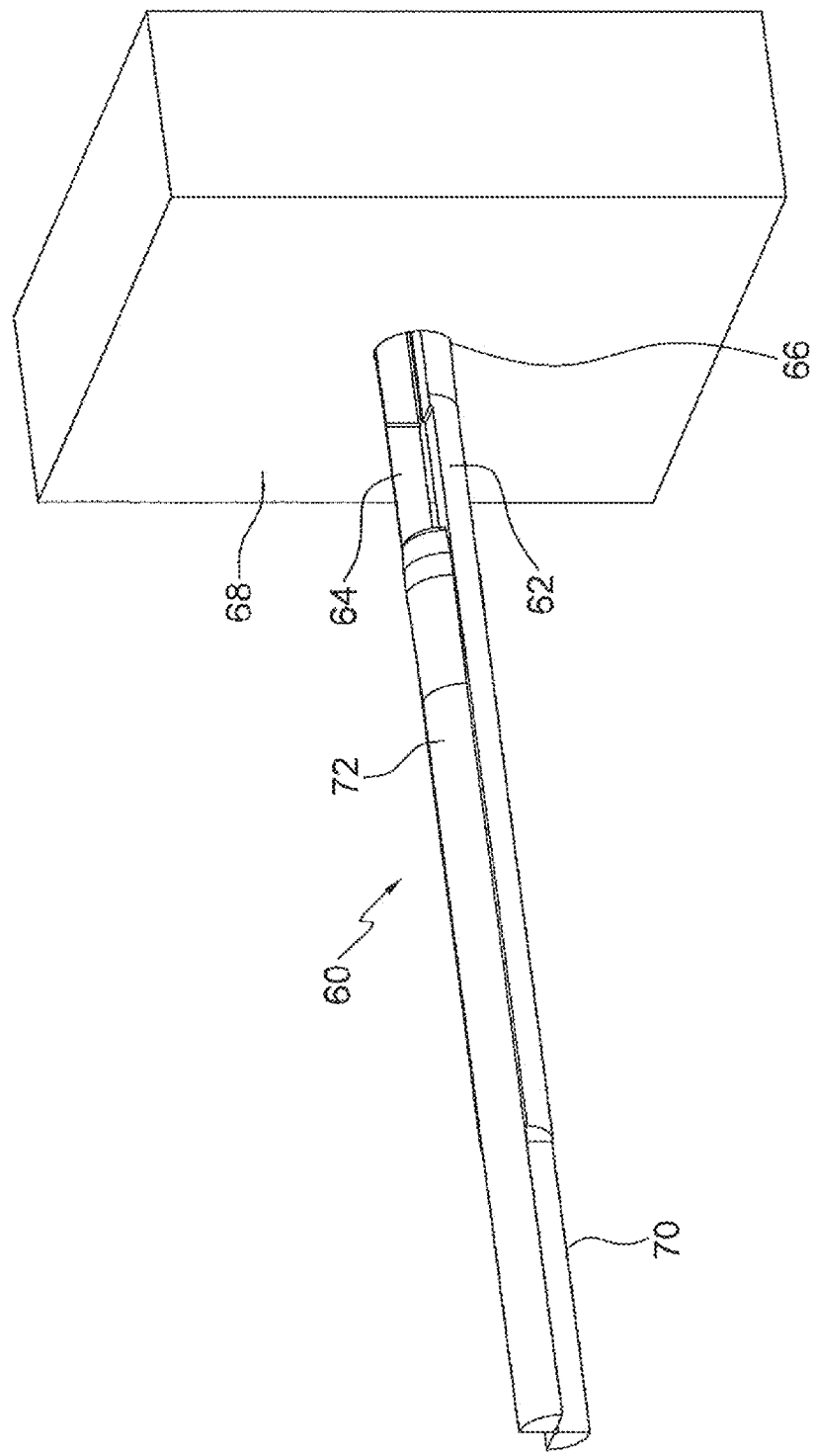
FIG. 11 is a simplified view of the mandrel showing the forward segments moving into the hole in the metal piece and the rear segments remaining outside of the hole.
Figure 12:
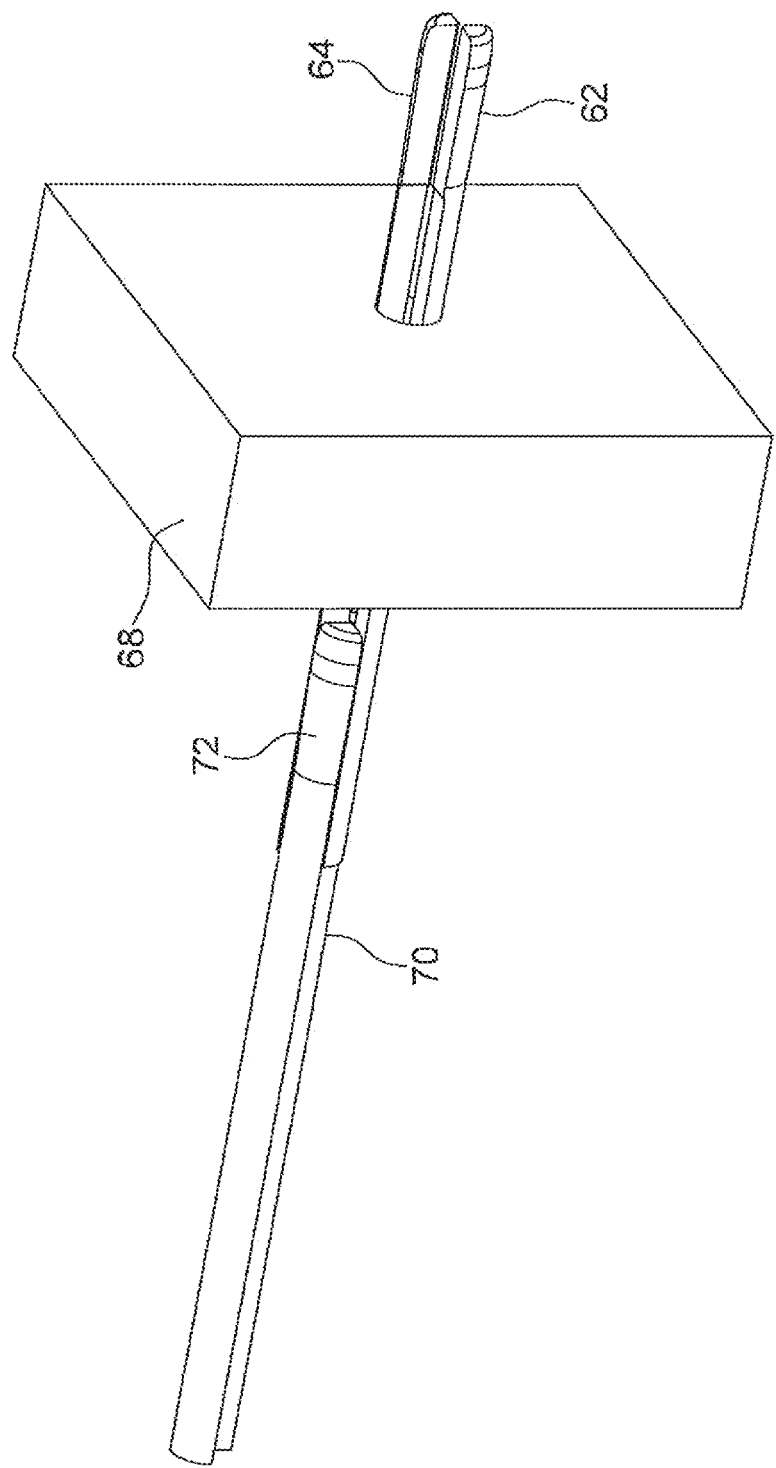
FIG. 12 is a simplified view of the mandrel showing the forward mandrel segments having moved through the hole in the metal piece and the rear mandrel segments remaining outside of the hole.

FIGS. 11 through 16 show the sequence of operation of a segmented mandrel 60 in simplified form, for clarity, without the driver assembly/handle, but with individual steps to accomplish cold working of a hole in a metal piece. FIG. 11 shows the position of the mandrel 60 with forward segments 62, 64 positioned in an opening 66 in a metal piece 68 with rear segments 70, 72 approaching the opening. It should be understood that in the manufacture of aircraft, a very large number of openings in a given metal piece are pre-established, each of which can be cold worked using the cold working process (technique) of the present invention. As shown in FIGS. 11 and 12, in operation, the two rear segments 70 and 72 in the segmented mandrel are positioned rearwardly, before entering the metal piece 68. The two forward segments 62, 64 can easily pass through opening 66 in metal piece 68. FIG. 12 shows the forward segments completely through the metal piece, while the rear segments remain outside of the metal piece.

Figure 13:
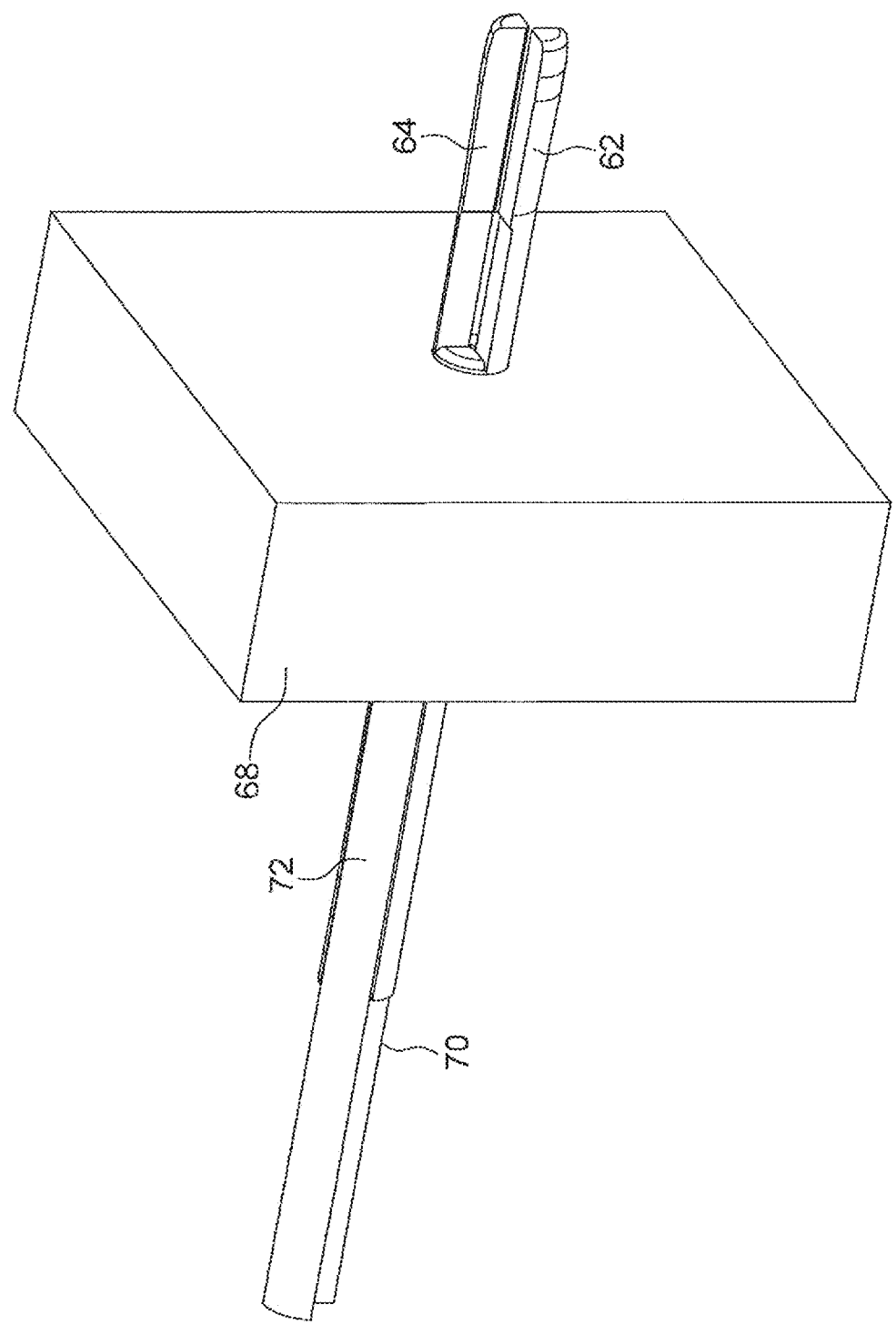
FIG. 13 is a perspective view showing the forward mandrel segments through the hole in the metal piece to a predetermined position with the rear mandrel segments moving through the hole.
Figure 14:
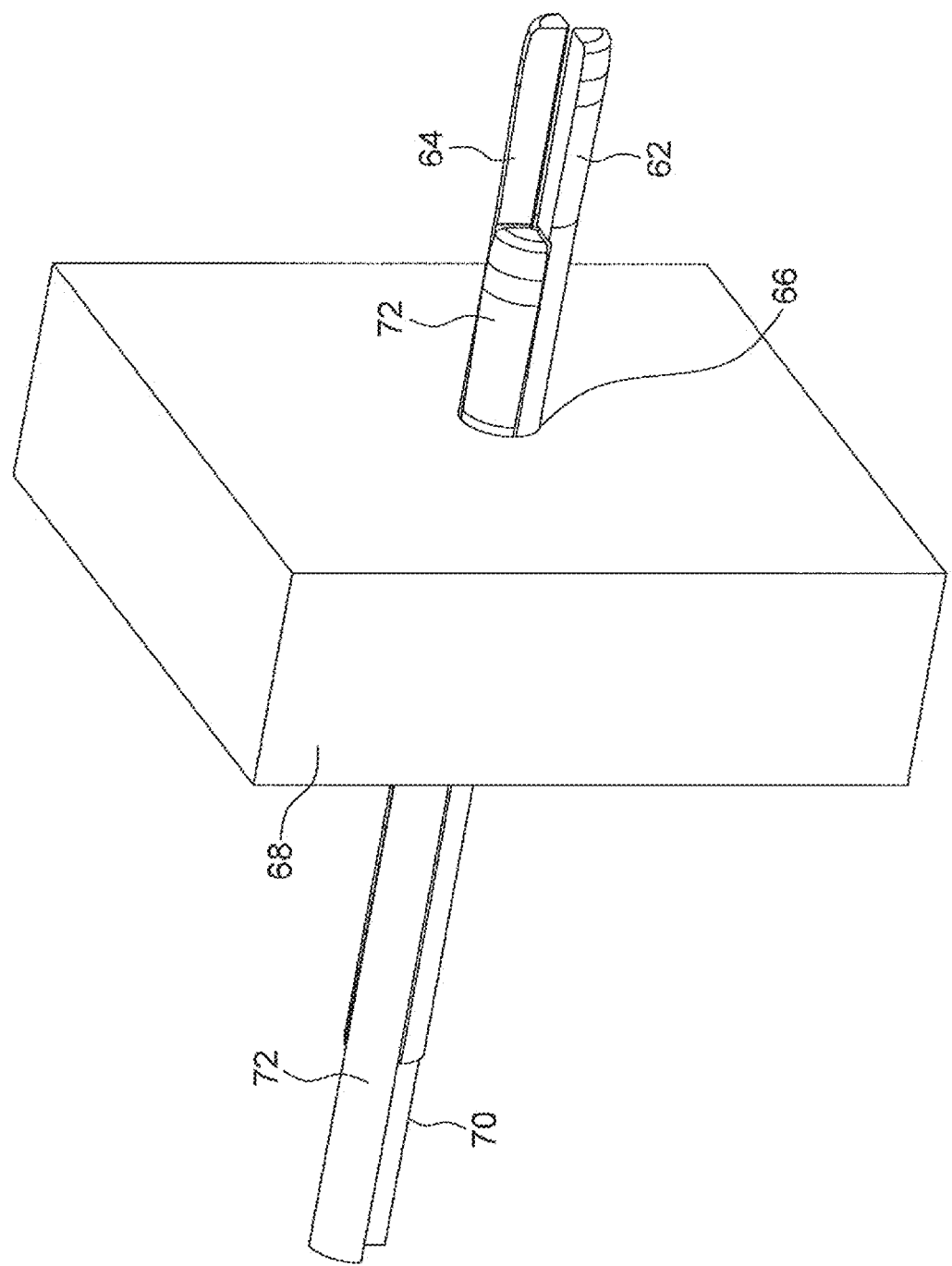
FIG. 14 is a simplified view showing the rear mandrel segments positioned adjacent the forward mandrel segments through the hole in the metal piece.
Figure 15:
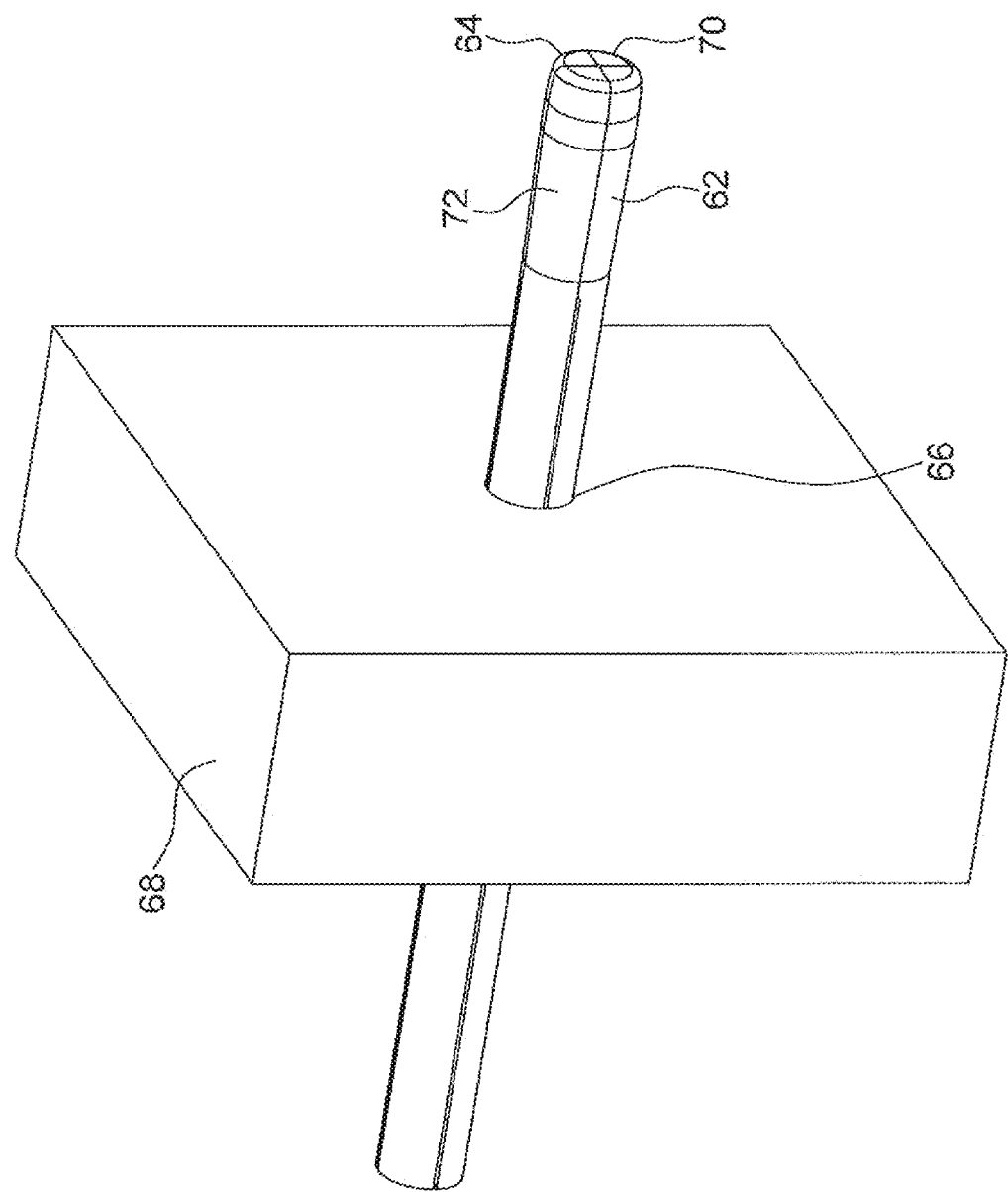
FIG. 15 is a simplified view showing the rear mandrel segments fully through the hole and aligned with the forward mandrel pieces.

In FIG. 13, the rear segments 70 and 72 have now been moved through the hole 66 by air pressure since the forward segments have room to move inwardly because of the relieved portions of the connecting surfaces of the forward segments 62, 64. Again, the relieved portions of the connecting surfaces of the forward segments permit sufficient space to permit the rear segments to pass through the opening. FIG. 14 shows the rear segments 70, 72 having been moved through opening 66 by air pressure. FIG. 15 shows the rear segments 70, 72 fully through the opening 66 in the metal piece 68 and aligned forwardly with the forward segments 62, 64. In this position, the front end of the segmented mandrel 60 has a diameter which is greater than the opening of the hole 66 in the metal piece 68. Next, in FIG. 16, the segmented mandrel has been pulled back through the opening 66 by hydraulic pressure, 10,000 PSI in the embodiment shown, creating the desired cold working results. The hole 66 is expanded without pressing any ridges into the hole, since the present invention does not require a sleeve. This invention thus overcomes the substantial disadvantages of the two presently used cold working systems.

Accordingly, a new cold working tool has been developed which overcomes the disadvantages of prior cold working tools, with a mandrel which is segmented into four parts with two opposing parts having relieved contact surfaces. As shown in the several figures, the movement of the segments of the mandrel is accomplished with piston action, air pressure and a hydraulic pump. Other arrangements can be used to accomplish movement of the forward and rear segments of the mandrel, individually and together.

It should be understood that while the preferred embodiment includes four segments, other numbers of segments can be used, including additional segments. The segments must be configured, however, to permit the rear segments to move inward to permit them to pass through the opening in the metal piece and then expand outwardly after they have moved forward through the opening to cold work the metal piece in combination with the forward segments by hydraulic or other high-pressure action.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. A cold working tool for openings in metal pieces, comprising:
   a segmented mandrel having four segments including two forward segments opposing each other and two rear segments opposing each other alternatingly positioned between the two forward segments,
   wherein the two forward segments and the two rear segments when fitted together have an approximately circular cross-section,
   wherein each segment of the two forward segments and each segment of the two rear segments has a substantially quarter-cylinder form with a curved outer surface, a flat inner surface opposite the curved outer surface and connecting surfaces between the outer and inner surfaces, and
   wherein the connecting surfaces of the two forward opposing segments are slightly relieved starting from a distance from distal ends of the two forward segments a distance toward proximal ends thereof to permit the two rear segments to inwardly press adjacent the two forward segments and permit the two rear segments and the forward two segments to pass through an opening in a metal workpiece to a position where distal ends of all the segments extend beyond a distal end of the opening and then, when the two rear segments are moved farther through the opening to match the extent of the two forward segments, to move radially outward so that the circumference of the segmented mandrel is larger than the opening in the metal workpiece, while the proximal end of the segmented mandrel remains outside a proximal end of the opening for pulling of the segmented mandrel so that the opening in the metal piece is cold worked as the mandrel is pulled back through the opening.

2. The cold working tool of claim 1, wherein the outer surfaces of the two forward segments and the two rear segments are substantially identical.

3. The cold working tool of claim 1, wherein the inner surfaces of the two forward segments are slightly smaller in width than the inner surfaces of the two rear segments.

4. The cold working tool of claim 1, wherein the connecting surfaces of the two forward segments are relieved approximately 0.003-0.050 inches extending toward the proximal ends of the two forward segments starting from approximately 0.8 inches from the distal ends of the two forward segments.

5. The cold working tool of claim 1, wherein the two rear segments are axially moveable relative to the two forward segments and wherein the two forward segments and the two rear segments also are axially moveable together.

* * * * *